United States Patent [19]

Matsumoto

[11] Patent Number: 4,976,385
[45] Date of Patent: Dec. 11, 1990

[54] HOLDER FOR TUBULAR CONTAINER

[75] Inventor: Takashi Matsumoto, Iwaki, Japan

[73] Assignee: Matsumoto Design Company Limited, Fukushima, Japan

[21] Appl. No.: 279,102

[22] Filed: Dec. 2, 1988

[30] Foreign Application Priority Data

Dec. 21, 1987 [JP] Japan .................................. 62-193575
Oct. 12, 1988 [JP] Japan .................................. 63-133626

[51] Int. Cl.⁵ .............................................. B60R 7/00
[52] U.S. Cl. ........................... 224/42.42; 224/42.45 R; 248/311.2; 248/309.4; 248/206.5
[58] Field of Search ..................... 224/42.45 R, 42.42; 248/309.4, 311.2, 310, 206.5, 683; 220/85 H

[56] References Cited

U.S. PATENT DOCUMENTS

| | | | |
|---|---|---|---|
| 3,149,268 | 9/1964 | Hansen et al. | 248/206.5 |
| 3,269,608 | 8/1966 | Weber, III | 248/309.4 |
| 4,721,276 | 1/1988 | Moss | 248/205.2 |
| 4,728,018 | 3/1988 | Parker | 224/42.42 |
| 4,749,112 | 6/1988 | Harper | 224/42.45 R |

FOREIGN PATENT DOCUMENTS 790463 7/1968 Canada .............................. 248/206.5
63-89336 6/1988 Japan .

Primary Examiner—Linda J. Sholl
Attorney, Agent, or Firm—Wenderoth, Lind & Ponack

[57] ABSTRACT

The present invention is drawn to a holder for a tubular container which is provided with at least two attracting magnet parts, which are respectively provided with a magnet for attracting and holding a tubular container made of a magnetic material in an upright position, at a front face of a base body, and an elastic lower end support which is located below the magnet parts and supports a bottom of the tubular container. At the front face of the base body, a guide slope plate has a surface inclined from the rear to the front of the base body at the upper part of the base body so that a container held by the magnet parts can be easily removed by inserting one's hand between the container and the guide slope plate. Alternatively, the holder for a tubular container can include attracting magnet parts adapted to have their magnetically attracting force rendered effective or ineffective so that the container can be easily removed.

2 Claims, 7 Drawing Sheets

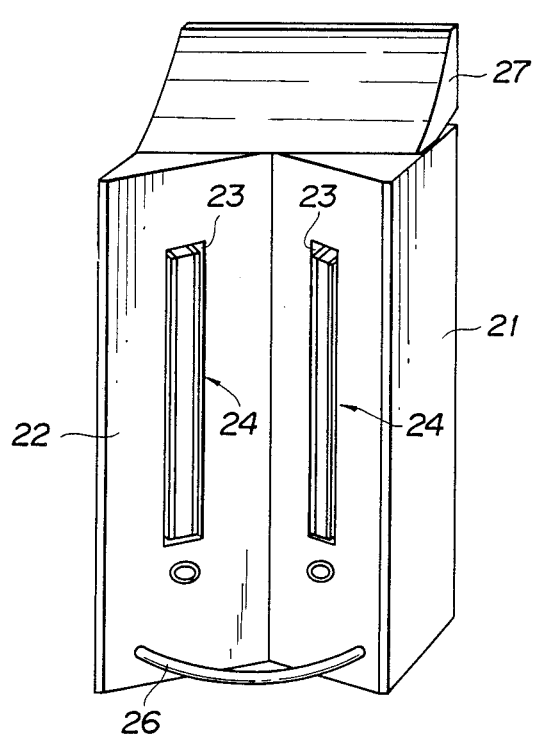
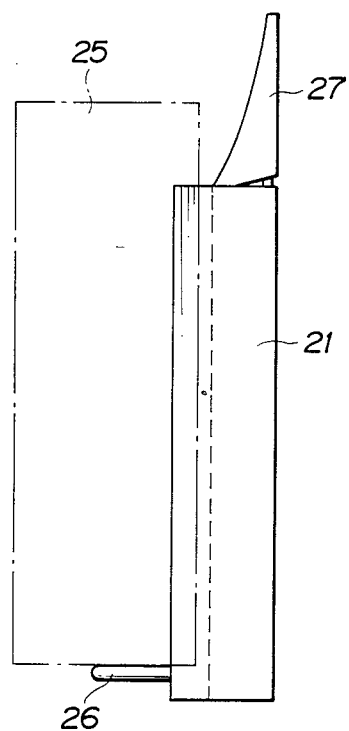
FIG. 9  FIG. 10
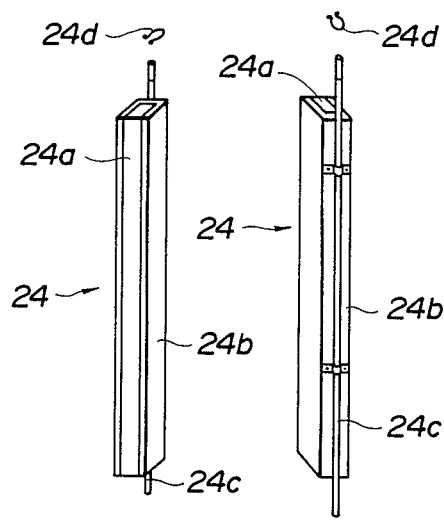
FIG. 11(a)  FIG. 11(b)

HOLDER FOR TUBULAR CONTAINER

BACKGROUND OF THE INVENTION

The present invention relates to a holder for holding a tubular container and which holder is installed on an internal side of a door or a rear side of a seat in various types of automobiles to hold a container which is magnetically attractable or covered with a magnetic tape or the like applied thereto. The holder can thus magnetically attract such cans or containers which are filled with refreshing beverages such as juice, tea, etc.

Various types of container holders which are designated to be installed on the rear side of the seat in an automobile, particularly, in a bus have been proposed.

There are, however, no container holders which hold a container by utilizing a magnetic attracting force except for the container holder proposed by the applicant of the present invention in Laid-Open Japanese Utility Model Application SHO No. 63-89336.

The proposed tubular container holder comprises a joint section which is magnetized to linearly contact the container at two or more positions along its lengthwise direction. The joint section is formed on the front side of a base body. So that a tubular container can be held uprightly, the lower part of said joint section is provided with a lower end support for supporting the bottom of said tubular container. And, a mounting section for mounting the container holder in a supporting position is provided on the rear part of the base body.

If this holder for a tubular container is used in an automobile as described above, safety is ensured even when one comes in contact with a protruding part of the holder due to jarring of the automobile during running since the height of the protruding part of the holder is less than that of the type of holder manufactured before the present invention was proposed And, the angle defined by the protruding part is advantageous in that a container held by this holder in a space defining the angle will not be unstable.

In the proposed tubular container holder which magnetically attracts and holds the tubular container, the attracting force is inversely proportional to the square of the distance between the magnet and the container due to the property of the magnet Accordingly, when removing the container from the holder, a strong force is required because the attracting force is apt to be powerful with the container so held, and only a small force is required the instant that the container is removed from the holder. Therefore, when an opened container held by the holder is removed from the holder, the beverage in the container may be splashed out due to an excessively energetic motion. It is clear that it is particularly difficult for a driver to gently remove a container from the holder by one hand without the contents of the container splashing out which of course is a disadvantage.

SUMMARY OF THE INVENTION

An object of the present invention is to provide a holder for a tubular container which holds a container by a magnetic force and allows the container attracted and held by the holder to be gently removed.

According to a first embodiment of the present invention, a tubular container holder comprises two or more attracting magnet parts provided with magnet portions for attracting and holding a tubular container, which is an object to be held in an upright position on the front face of a base body, an elastic lower end support member which is located below said magnet portions to support the bottom of said tubular container, and a guide slope plate for establishing a wedge-shaped clearance between said holder and the tubular container attracted and held by the attracting magnet parts thereof, said guide slope plate extending from the upper part of said base body.

According to second through sixth embodiments of the present invention, a tubular container holder comprises two or more attracting magnet parts provided with magnet portions for attracting and holding a tubular container, which is an object to be held in an upright position on the front face of a base body, and an elastic lower end support member which is located below said magnet portions to support the bottom of said tubular container, and wherein said attracting magnet parts are adapted to be operable so that the magnetic attracting forces generated thereby which tend to attract the tubular container are rendered effective or ineffective.

The above and other features of the present invention will be fully understood from the following description, referring to the accompanying drawings. However, said drawings are only explanatory and are not intended to be limitative of the present invention.

BRIEF DESCRIPTION OF THE DRAWINGS

FIGS. 1 to 4 respectively show the first embodiment of the present invention;

FIG. 1 is a general perspective view of a holder for a tubular container according to the first embodiment of the present invention;

FIG. 2 is a side view of the holder for a tubular container in which a juice can is held;

FIG. 4 is a general perspective view of the tubular container holder as installed on the internal side of a door at the driver's seat of an automobile;

FIGS. 5 to 8 respectively show the second embodiment of the present invention;

FIG. 5 is a general perspective view of a holder for a tubular container according to the second embodiment of the invention;

FIG. 6 is a side view of the holder for a tubular container of FIG. 5 in which a juice can is held;

FIGS. 9 to 13 respectively show the third embodiment of the present invention;

FIG. 9 is a perspective view of a holder for a tubular container according to the third embodiment of the present invention;

FIG. 10 is a side view of the holder for the tubular container of FIG. 9 in which a juice can is held;

FIG. 11(a) is an enlarged perspective view of the magnet part of the holder of FIG. 9 as viewed from the front of the magnet part;

FIG. 11(b) is an enlarged perspective view of the magnet part of the holder of FIG. 9 as viewed from the rear of the magnet part;

FIG. 12 is a perspective view of the base body of the holder of FIG. 9 as viewed from the rear of the base body;

FIG. 13 is a perspective view of the guide slope plate and the elements operatively associated with the guide slope plate of the holder of FIG. 9 as viewed from the rear thereof;

FIGS. 14 to 16 respectively show the fourth embodiment of the present invention;

FIG. 15 is a general perspective view of the magnet part and the mechanism which prevents the magnetic attracting force generated by the magnet part from affecting the tubular container of the fourth embodiment;

FIG. 16 is a side view of the magnet part and the mechanism which prevents magnetic attracting force generated by the magnet part from affecting the tubular container of the fourth embodiment;

FIG. 17 is an assembly view, in perspective, of the base body, as viewed from the front of the base body, of a holder for a tubular container according to the fifth embodiment of the present invention;

FIG. 18 is an assembly view, in perspective, of the base body of FIG. 17 as viewed from the rear of the base body;

FIG. 19 is a perspective view of the magnet part and the mechanism which prevents the magnetic attracting force generated by the magnet part from affecting the tubular container according to the fifth embodiment;

FIG. 20 is a side view of the magnet part and the mechanism which prevents the magnetic attracting force generated by the magnet part from affecting the tubular container of the fifth embodiment;

FIG. 21 is an assembly view of the base body, as viewed from the front of the base body, of a holder for a tubular container according to the sixth embodiment of the present invention;

FIG. 22 is an assembly view, in perspective, of the base body of FIG. 21 as viewed from the rear of the base body;

FIG. 23 is a side view of the magnet part and the mechanism which prevents the magnetic attracting force generated by the magnet part from affecting the tubular container according to the sixth embodiment;

FIG. 24 is a front view of the magnet part and the mechanism which prevents the magnetic attracting force generated by the magnet part from affecting the tubular container according to the sixth embodiment; and FIG. 25 is a plan view of the magnet part and the mechanism which prevents the magnetic attracting force generated by the magnet part from affecting the tubular container according to the sixth embodiment.

DETAILED DESCRIPTION OF THE PREFERRED EMBODIMENTS

The following is a description of the preferred embodiments of the present invention referring to the accompanying drawings.

First, a first embodiment of the present invention will be described below with reference to FIGS. 1-4.

Figure 1:
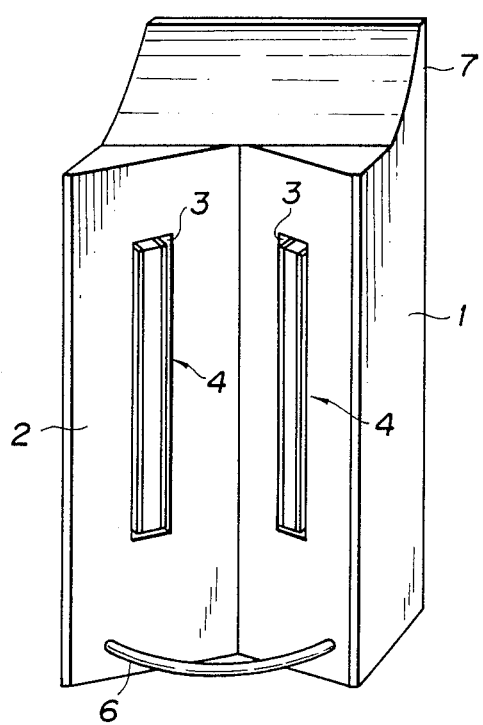

As shown in FIG. 1, a V-shaped joint section 2 defining a large angular space extending vertically is provided on the front face of the base body, and a long and narrow magnet mounting slit 3 is formed in each of the face of the joint section 2. The magnet part 4 is mounted in these slits, respectively.

Figures 3A, 3B:
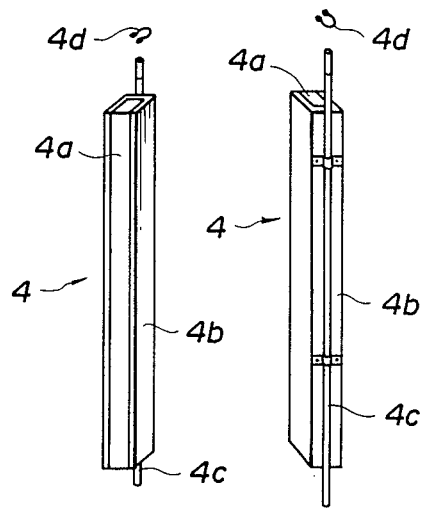
FIG. 3(a) is a general perspective view of a magnet part of the holder, as viewed from the front thereof.
FIG. 3(b) is a general perspective view of the magnet part as viewed from the rear thereof.

Said magnet part 4, as shown in FIGS. 3(a) and (b), comprises a long rectangular parallelepipedal magnet piece 4a and a magnetic metal case 4b having a U-shaped cross section which holds said magnet piece 4a in a manner in which its front part is exposed. Said magnet part 4 is mounted so that a support shaft 4c is freely rotatable in the lenghthwise direction thereof at the rear of the magnetic metal case 4b whereby the magnet part 4 is held in said magnet mounting slits 3, 3 so as to be slightly rotatable around said support shaft 4c. The base body is provided with shaft holes, for accommodating upper and lower ends of said support shaft 4c, at upper and lower ends of mounting slits 3. The shaft holes at upper and lower ends of said magnet mounting slits 3, 3 are to be formed such that the shaft hole at the upper end is relatively deep. The upper end of the support shaft 4c is deeply inserted into the shaft hole at the upper end of the magnetic mounting slit and subsequently the lower end of shaft 4c is inserted into the shaft hole at the lower end. Then a coupling 4d is engaged with a circumferential groove formed on the outer periphery of the upper end of the support shaft 4c in a manner which prevents the support shaft from coming out of the shaft hole. In this case said magnet part 4 is arranged so that its front face slightly protrudes from the joint section 2 of said base body 1.

Figure 2:
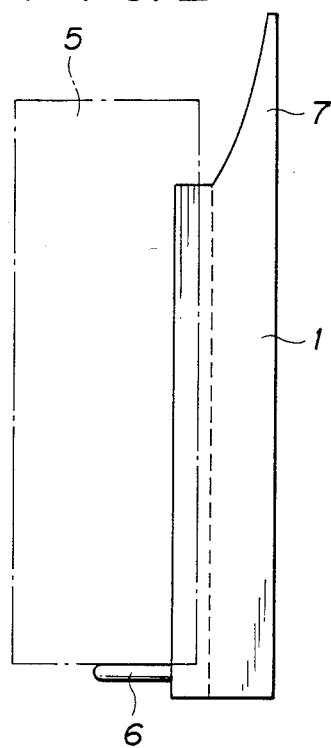

Fixing holes are respectively provided at the lower portion of the faces of the joint section 2 of said base body 1, and ends of a shaft type spring member 6 are inserted into said fixing holes and are fixed to the base body with an adhesive agent. Thus as shown in FIGS. 1 and 2, the spring member 6 forms a semi-circular lower end support 6. When a part of a human body pushes or strikes this lower end support 6, it is elastically deformed to ensure safety.

Furthermore, a guide slope plate 7 is uprightly provided at the upper rear end of the base body 1. This guide slope plate 7, as shown in FIGS. 1 and 2, is a plate member which is sloped from the rear to the front of the base body 1 and, as particularly shown in FIG. 2, this plate member is uprightly provided so that an almost wedge-type clearance as viewed from the side is formed between the tubular container such as juice can 5, or the like, attracted to and held by the magnet part 4 and said guide slope plate.

Figure 4:
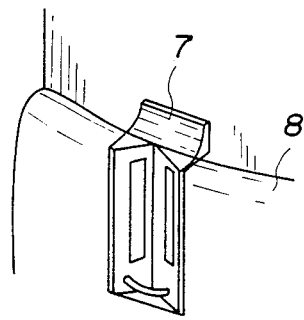

In this embodiment, the tubular container holder, as shown in FIG. 4, is fitted and fixed with an adhesive agent in a recess which is provided in advance in the inside of the door 8 at the driver's seat of an automobile and which has dimensions that correspond to the external dimensions of the holder.

A drain pipe extends from the bottom of this holder to the lower part of the door.

In this embodiment, the tubular container holder is used as discussed below.

In this embodiment, the tubular container holder is mounted on the inside of the door 8 at the driver's seat of the automobile and accordingly it is convenient for the driver to store a magnetic metal can container containing a type of drink such as, for example, a juice can 5 in the holder while driving.

The juice can 5 can be stored in the tubular container holder by pushing the external periphery of the can against the joint section 2 of the base body. The juice can 5 is attracted and held by the holder when the external periphery thereof contacts the magnet parts 4, 4 provided at the joint part 2. Magnet parts 4, 4 which are allowed to rotate in a horizontal direction rotate to an appropriate angle of contact in accordance with the diameter of the can when the magnet parts come in contact with the juice can 5 to ensure the magnetic attraction of the can. In this case, the bottom of the juice can 5 is supported by the lower end support 6.

Since the external periphery of the juice can 5 is attracted by the magnet parts 4, 4 and its bottom is supported by the lower end support 6, said juice can 5 is firmly held even under adverse conditions such as considerable rocking and vibration which occur when travelling on a bad road.

When removing the juice can 5 from said holder, the juice can 5 can be easily pushed out by inserting an opened hand between the juice can 5 and said guide slope plate 7 from above and pushing the juice can 5 down. At the same time, the juice can 5 can be easily and gently removed from the magnet parts 4 by seizing the juice can 5 with the hand so inserted.

Thus, even an opened can still containing juice can be easily removed from the holder without spilling juice from the can.

The following is a description of the second embodiment of the invention, referring to FIGS. 5 to 8.

Figure 5:
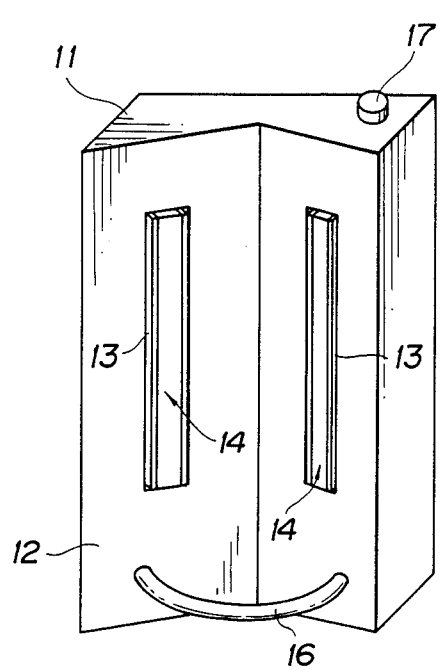

As shown in FIG. 5, the V-shaped joint section 12 defining a large angle as viewed from above is formed at the front face of the base body 11, a long narrow magnet mounting slit 13 is formed respectively on both V-shaped plates which form the joint section 12, and a magnet part 14 is mounted in each of these slits.

Said magnet part 14 comprises, a shown in FIGS. 7(a), 7(b), 8(a) and 8(b), a long rectangular parallelepipedal core 14b provided with a winding drum 14a, an electromagnetic coil 14c wound around the winding drum 14a of said core 14b, and a magnetic metal case having a U-shaped cross section which holds said core 14b wound with the electromagnetic coil 14c in a manner in which the front of the core is exposed. Current is supplied from the battery of the automobile which serves as the power supply of said electromagnetic coil 14c.

Figures 8A, 8B:
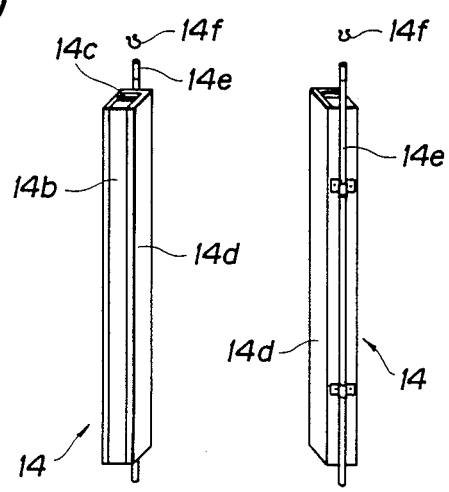
FIG. 8(a) is an enlarged perspective view of the magnet part of the holder of FIG. 5 as viewed from the front thereof.
FIG. 8(b) is an enlarged perspective view of the magnet part of the holder of FIG. 5 as viewed from the rear of the magnet part.
Figure 12:
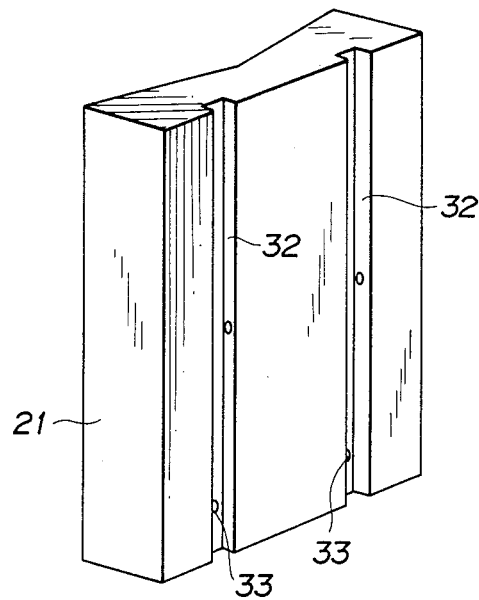

Magnet parts 14, as shown in FIGS. 8(a) and 8(b), are slightly rotatable in said magnet mounting slits 13, 13 via respective support shafts 14e, 14e which are provided to be freely rotatable at the rear of the magnetic metal cases 14d, 14d in the lengthwise direction.

The shaft holes for accommodating upper and lower ends of each said support shaft 14e are provided in the base body at the upper and lower parts of these slits. The shaft holes at upper and lower ends of said magnet mounting slits 13, 13 are to be formed such that the shaft hole at the upper end is relatively deep. The upper end of the support shaft 14e is deeply inserted into the shaft hole at the upper end of the magnet mounting slit and subsequently the lower end of shaft 14e is inserted into the shaft hole at the lower end. Then a coupling 14f is engaged with a circumferential groove formed on the external periphery of the upper end of the support shaft 14e in a manner which prevents the support shaft 14e from coming out of the shaft hole.

In this case, said magnet parts 14, 14 are arranged so that their front faces slightly protrude from the joint section 12 of said base body 11.

Fixing holes are respectively provided at the lower portion of the plates of the joint section 12 of said base body 11, and ends of a shaft type spring member 16 are inserted into said fixing holes and are fixed to the base body with an adhesive agent. Thus as shown in FIGS. 5 and 6, the spring member 16 forms a semi-circular lower end support 16.

Figure 6:
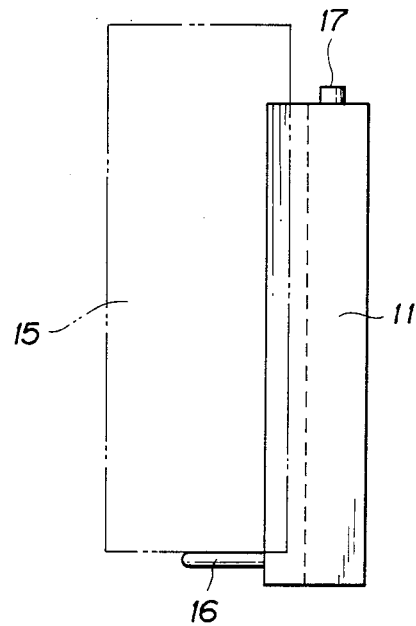
Figures 7A, 7B:
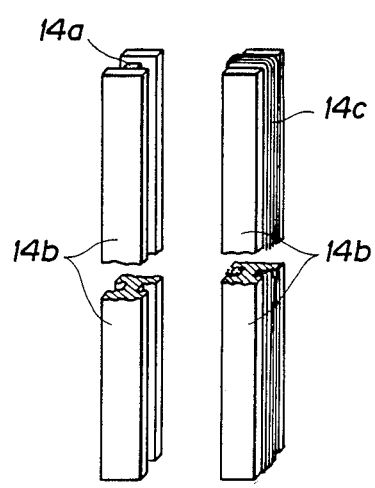
FIG. 7(a) is a partly cut-away enlarged perspective view of the core of the magnet part of the holder of FIG. 5.
FIG. 7(b) is a partly cut-away enlarged perspective view of the core around which an electromagnetic coil is wound.

A push button switch 17 is provided on the upper end of the base body 11 as shown in FIGS. 5 and 6. This push button switch 17 is used to turn on and off the current to be supplied to the electromagnetic coils 14c of said magnet parts 14, 14. As described above, a current from the battery of the automobile is to be supplied to said electromagnetic magnetic coils 14, 14c and said push button switch 17 is operatively disposed in the drive current supplying circuit led in the base body 11. This push button switch 17 which is normally kept closed is employed and, while the push button is kept pressed, a switch of the circuit remains open.

The following discusses the use of the holder described above when installed in the inside of a door at the driver's seat of the automobile similar to the first embodiment of the present invention.

Such a holder is convenient for the driver to store a container such as a magnetic metal juice can 15 or the like while driving the automobile.

The juice can 15 can be stored in the holder by pushing the external periphery of the can against the joint section 12 of the base body 11 as shown in FIG. 6. In this case, the push button switch 17 is not pushed down, the current passes through the electromagnetic coils 14c of magnet parts 14, 14 to cause a magnetic field to be generated and thus the cores 14b, 14b serve as an electromagnet with a specified magnetism. The external periphery of the juice can 5 comes in contact with magnet parts 14, 14 provided on the joint section 12 and is attracted as held by these magnet parts. Magnet parts 14, 14 which are able to rotate in a horizontal direction rotate to an appropriate angle of contact in accordance with the diameter of the juice can 15 when the magnet parts come in contact with the can to ensure magnetic attraction of the can. In this case, the bottom of the juice can 15 is supported by the lower end support 16.

When removing said juice can 15 from said holder, the push button switch 17 at the upper end of the base body 11 is pushed down to turn off the supply of current while the upper part of the juice can 15 is held. The current supplied to the electromagnetic coils 14c, 14c of magnet parts 14, 14 is stopped and the cores 14b, 14b lose their magnetism. Accordingly, the juice can 15 can be gently removed from the holder without an extra strong force.

Thus even an opened juice can 15 still containing juice can be easily removed from the holder without spilling juice.

The following is a description of the third embodiment of the present invention, referring to FIGS. 9 to 13.

As shown in FIG. 9, a V-shaped joint section 22 defining a large angular space extending vertically is provided on the front face of the base body 21, and a long and narrow magnet mounting slit 23 is formed on each of the sloped surfaces of the joint section. A respective magnet part 24 is arranged in each slit.

Said magnet part 24, as shown in FIGS. 11(a) and 11(b), comprises a long rectangular parallelepipedal magnet piece 24a and magnetic metal case 24b having a U-shaped cross section which holds said magnet piece 24a in a manner in which its front part is exposed. Said magnet part 24 is mounted so that a support shaft 24c is freely rotatable in the lengthwise direction thereof at the rear of the magnetic metal case 24b whereby the magneti part 24 is held in said magnet mounting slits 23, 23 so as to be slightly rotatable around said support shaft 24c. Upper and lower ends of said support shaft 24c are inserted into shaft holes provided in the base body at upper and lower ends of said magnet mounting slit 23. The support shaft 24c is fixed by engaging the coupling 24d with the circumferential groove formed on the external periphery on the upper end of the support shaft 24c Said shaft hole at the upper end is relatively deep and the upper end of the support shaft 34c is inserted into the upper shaft hole. Then the lower end of said support shaft 24c is inserted into the lower shaft hole.

In this case, said magnet part 24 is provided so that its front face protrudes slightly from the surface of the joint section 22 of said base body 21.

Fixing holes are respectively provided at the lower portion of the faces of the joint section 22 of said base body 21, and ends of a shaft type spring member 26 are inserted into said fixing holes and are fixed to the base body with an adhesive agent. Thus as shown in FIGS. 9 and 10, the spring member 26 forms a semi-circular lower end support 26. When a part of a human body pushes or strikes this lower end support 26, it is elastically deformed to ensure safety.

Furthermore, a guide slope plate 27 is uprightly provided at the upper rear end of the base body 21. This guide slope plate 27, as shown in FIGS. 9 and 10, is a plate member which is sloped from the rear to the front of the base body 21 and, as particularly shown in FIG. 10, this plate member is uprightly provided so that an almost wedge-type clearance as viewed from the side is formed between the tubular container such as juice can 25, or the like, attracted and held by the magnet part 24 and said guide slope plate.

Figure 13:
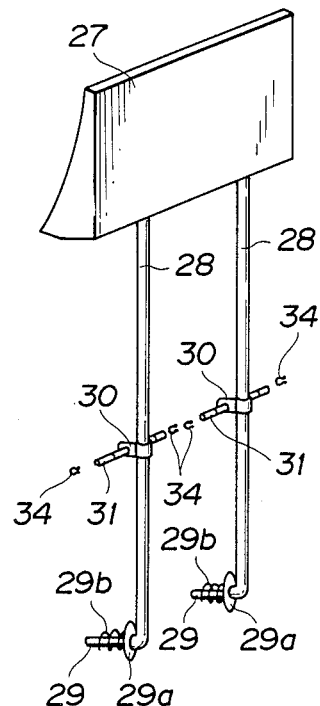

A pair of operating shafts 28, 28 are suspended from and fixed at the lower end of said guide slope plate 27 as shown in FIG. 13. A protrusion bar 29 which is bent at right angles with respect to the slope side of said guide slope part 27 is formed respectively at the lower ends of said operating shafts 28, 28. A bracket piece 30 is fixed at the approximate centers of the operating shafts 28, 28 and rotation shafts 31 are freely rotatable in the bracket pieces.

Two vertical shaft grooves 32, 32 are spaced the same distance apart as are said operating shafts 28, 28. Shaft holes are defined in both side walls at the centers of the shaft grooves 32, 32 with the right side shaft holes being deeper than the left side shaft holes. Through holes 33, 33 which extend to the joint section 22 are defined at the lower part of each of said shaft grooves 32, 32, respectively. Said through holes 33, 33 are located at positions where the protrusion bars 29, 29 can be inserted when the operating shafts 28, 28 are mounted in the shaft grooves 32, 32 with the rotation shafts 31, 31 inserted into said shaft holes at the centers of the shaft grooves 32, 32.

Said operating shafts 28, 28 are mounted in the shaft grooves 32, 32 as described above. Both ends of shafts 31, 31 are inserted into the shaft holes by first inserting respective ones of the ends into the deeper shaft holes at the right side. Next, the couplings 34, 34 are externally mounted on the rotation shafts, thus maintaining the state of insertion. In addition, the protrusion bars 29, 29 at the lower ends of the operating shafts 28, 28 are respectively provided with springs 29b, 29b mounted to flanges 29a, 29a at ends thereof and inserted into said through holes 33, 33. Said springs 29b, 29b are interposed between said flanges 29a, 29a and the portion of the base body defining the bottoms of shaft grooves 32, 32.

Furthermore, this tubular container holder is built in the inside of the door at the driver's seat of the automobile as in the previously described embodiments.

Accordingly, it is convenient for the driver to store a tubular container for various types of drinks such as, for example, a magnetic metal juice can 25, or the like, in the holder during driving.

The juice can 25 can be stored in the tubular container holder by pushing the external periphery of the can against the joint section 22 of the base body 21. The juice can 25 is attracted and held by the holder when the external periphery contacts the magnet part 24, 24 provided at the joint part 22. Magnet parts 24, 24 which are allowed to rotate in a horizontal direction rotate to an appropriate angle of contact in accordance with the diameter of the can when the magnet parts come in contact with the juice can 25 to ensure magnetic attraction of the can. In this case, the bottom of the juice can 25 is supported by the lower end support 26.

When removing the juice can 25 from said holder, an opened hand is inserted from above between the juice can 25 and said guide slope plate 27 and the juice can is pushed down by the hand, said guide slope plate 27 is pushed backwardly, the upper parts of the operating shafts 28, 28 are rotated backwardly, and the lower parts rotate in turn frontwardly around the rotation shafts 31, 31. Accordingly, the protrusion bars 29, 29 are forced into the lower part of the juice can 25 to provide a pushing action. Thus, the juice can 25 can be held by hand and gently removed from the magnet parts 24, 24 of the holder.

When the hand is released from said guide slope plate 27, protrusion bars 29, 29 are immediately returned to the rear home positions by the action of springs 29b, 29b.

Figure 14A:
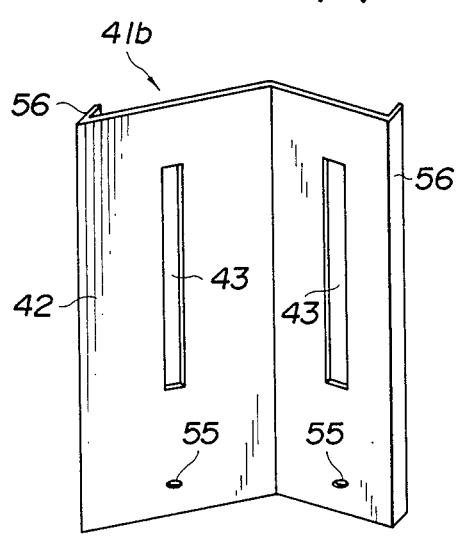
FIG. 14(a) is a perspective view of the front side plate of the base body of a holder for a tubular container according to the fourth embodiment of the present invention.
Figure 14B:
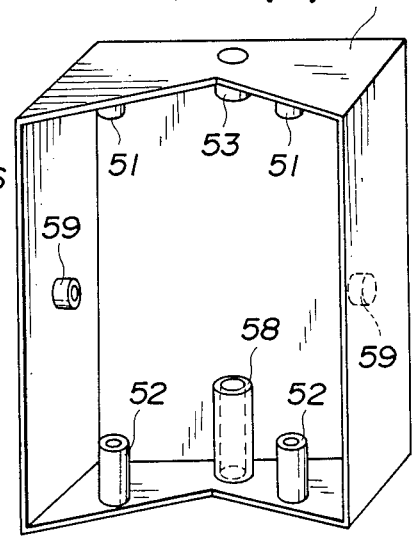
FIG. 14(b) is a perspective view of the base body of the fourth embodiment with the front side plate removed.
Figure 15:
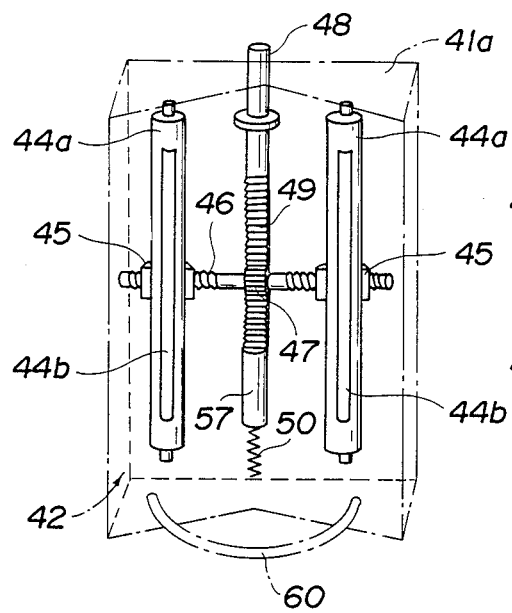
Figure 16:
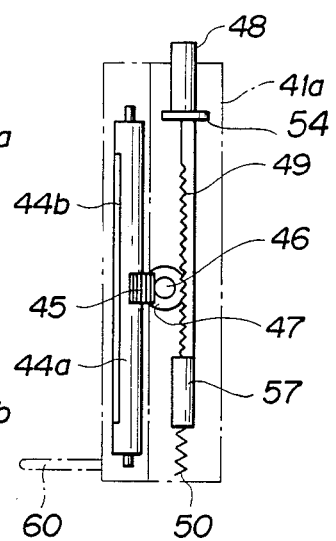

The following is a description of the fourth embodiment of the present invention, referring to FIGS. 14 to 16.

The container holder comprises a base body 41a and a front face plate 41b which closes the front of the body 41a as shown in FIGS. 14(a) and 14(b). The front face plate 41b as shown forms a large angular space extending vertically defined by a V-shaped surface constituting joint section 42. Two vertical parallel openings 43, 43 are formed in the faces of the joint section 42 of said front face plate 41b and coupling holes 55, 55 are provided below said openings 43, 43. Upper and lower ends of the body 41a have front edges each defining an angle corresponding to the angle of the joint section 42 of said front face plate 41b. The front face plate 41b is mounted on the front end part of the body 41a, and connecting pieces 56, 56 which are bent and formed at both sides of the former are coupled with internal surfaces of both sides of the latter with an adhesive agent to close the front of the body 41a. Needless to say, such closure of the body 41a by said front face plate 41b should be done after all components comprising the mechanisms described below have been installed in the body 41a.

In the body 41a, as shown in FIGS. 15 and 16, two vertically disposed columnar members 44a, 44a are freely rotatable and parts of their peripheral surfaces are slightly exposed at the openings 43, 43 of said front face plate 41b. A long and thin magnet 44b is embedded and fixed respectively in the parts of said columnar members 44a, 44a which are exposed at said openings 43, 43. In addition, sector gears 45, 45 are externally mounted to and fixed at each center of said columnar members 44a, 44a, respectively, and face toward the rear of the body 41a.

Said sector gears 45, 45 are engaged, respectively, with ends of a worm gear 46 extending perpendicular to said columnar members 44a, 44a. A pinion 47 is externally mounted to and fixed at the center of the worm gear 46 and engages a rack 49 defined by the lower end of an operating bar 48. The operating bar 48 is vertically movable and can be actuated at the upper end of the body 41a. In addition, a compression spring 50 which acts to raise said rack 49 is interposed between the lower end of a shaft 57 extending from the lower end of said rack 49 and the bottom of a guide cylinder 58 described below.

So as to be freely rotatable, the upper and lower ends of said columnar members 44a, 44a are inserted into bearing cylinders 51, 51 suspended from the upper plate of the body 41a and into bearing cylinders 52, 52 protruding from the lower plate, respectively. The shaft parts of the ends of said columnar members 44a, 44a are freely retractable. Said operating bar 48 extends from the bottom center of the upper plate of the body 41a by being inserted into the guide cylinder 53 which has a hole open at the upper surface of the body 41a. The shaft part 57 extending from the operating bar 48 through the rack 49 is inserted into the upright guide cylinder 58 provided at the center of the lower plate. As described above, said shaft part 57 is subjected to a force acting in the upward direction of the compression spring 50 disposed between the lower end of the shaft part 57 and the bottom of the guide cylinder 58. Upward movement of shaft part 57 is stopped when the stopper flange 54 provided at the lower end of said operating bar 48 comes in contact with the lower end of the guide cylinder 53 of the upper plate. So as to be freely rotatable, the shaft parts of both ends of said worm gear 46 are inserted into bearing cylinders 59, 59 protruding oppositely from the internal surfaces of both sides of the body 41a. The shaft part of one end of said worm gear 46 is freely retractable.

In FIGS. 15 and 16, numerals 60 denote a lower end support having the same structure as those in the previously described embodiments.

Accordingly, if this holder is installed on the inside of the door at the driver's seat of the automobile as in the previous embodiments, it can be used as described below.

For example, if a magnetic metal juice can is pushed against the joint section 42, the can can be easily attracted and held by magnets 44b, 44b provided on the columnar members, 44a, 44a. The lower end of the can is supported by the lower end support 60.

When removing the juice can from the holder, it is satisfactory to seize the can by hand and push down the operating bar 48 protruding from the upper end of the body 41a. Thus, the pinion 47 is rotated with the downward movement of the rack 49 to cause the worm gear 46 to rotate, and sector gears 45, 45 which engage the worm gear 46 rotate slightly to somewhat rotate columnar members 44a, 44a. Thus, the distance between the magnets 44b, 44b and the external periphery of the juice can becomes slightly longer and the juice can can be easily removed from the holder with one hand.

The following describes the fifth embodiment of the present invention, referring to FIGS. 17 to 20.

Figure 17:
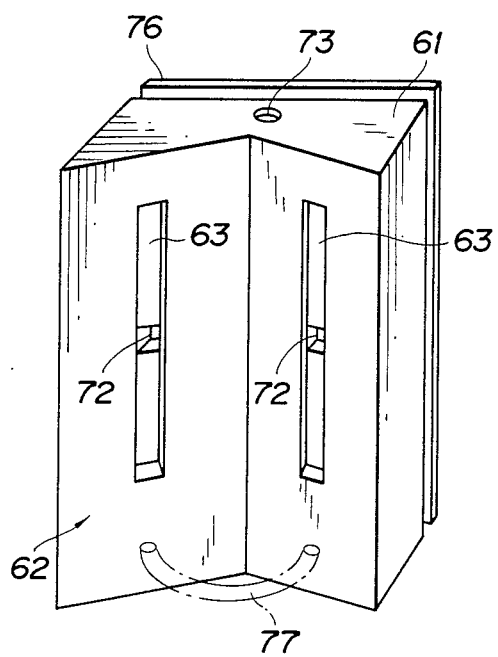
FIGS. 17 to 20 respectively show the fifth embodiment of the present invention.
Figure 18:
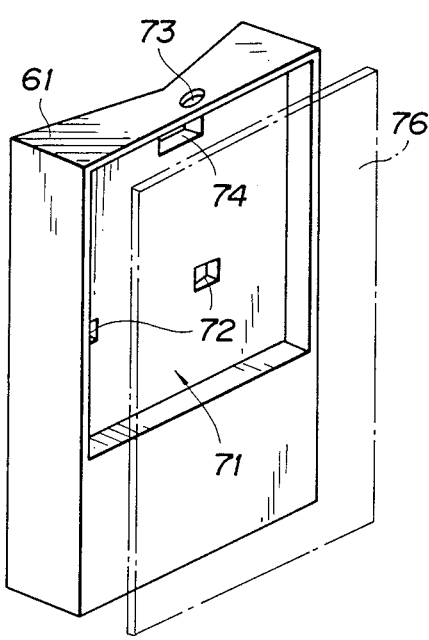

As shown in FIGS. 17 and 18, the front face of the plate type base body 61 is V-shaped, defining a large angle and constituting a joint section 62. A vertical rectangular slit 63 is provided in both sloped faces of said joint section 62. Both rectangular slits 63, 63 respectively communicate with through holes 72, 72, open to a space 71 at the rear of the base body 61, at the center of each of said rectangular slits.

Said space 71 has a width almost equal to the width of a coupling plate 66 described below and a height slightly smaller than the height of said coupling plate 66 plus the height of a wedge-shaped member 67 also described below. The depth of the space is as large as the range over which said coupling plate 66 can slightly advance and retract. A the upper center of said space section 71, and extending toward the front side of the base body 61 is a spring mounting part 74. In addition, a through hole 73 for accommodating an operating bar 68 (described below) is formed at the upper end of the base body 61 at the center of the upper surface defining the space section 71. The rear of said space section 71 is closed by adhering the cover plate 76 to the rear surface of the base body 61.

Figure 19:
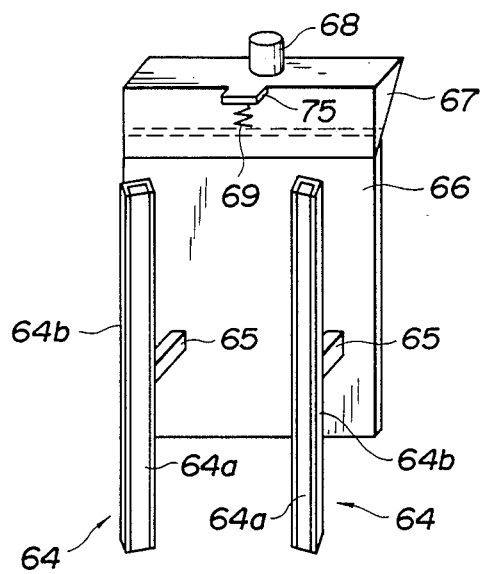
Figure 20:
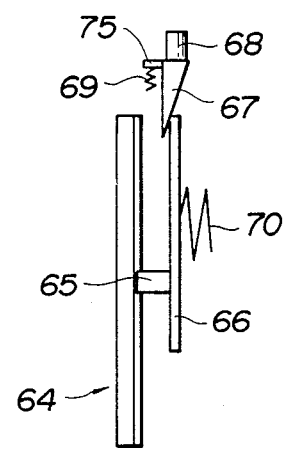

As shown in FIG. 19, two magnet parts 64, 64 are formed by rectangular parallelepipedal magnets 64a disposed within magnetic metal cases 64b having a U-shaped cross section and are mounted in said rectangular slits 63, 63 with the front faces of the magnet parts being slightly exposed. In this case, an elastic sheet provided with holes located at positions in correspondence with locations of the through holes 72 is set inside the body 61 over said rectangular slits 63, 63. Thus, the magnet parts 64, 64 are slightly retractable toward the rear of the base body 61. Coupling bars 65, 65 are respectively coupled to the rear sides of the magnet parts 64, 64 mounted within slits 63, 63 and further to a coupling plate 66 arranged in said space section 71, through said through holes 72, 72. A wedge-shaped member 67 is provided at the upper part of said coupling plate 66 as shown in FIGS. 19 and 20 in a manner in which said wedge-shaped member can freely move in the vertical direction while keep in contact with the front surface of the coupling plate 66. An upright operating bar 68 is provided at the upper end of said wedge-shaped member 67 and extends through the through hole 73 at the upper end of the base body 61 so as to be vertically movable. A flange 75 protrudes from the upper front end of said wedge-shaped member 67 into the upper part of the spring mounting part 74 formed at the upper center of said space section 71. Then a spring member 69 which serves to impart an upwardly acting force to the wedge-shaped member 67 is interposed between said flange 75 and the bottom of said spring mounting part 74. In addition, the spring member 70 which serves to provide an action force to urge the coupling plate 66 toward the front of the base body 61 is interposed between the rear of said coupling plate 66 and the cover plate 76 disposed behind the coupling plate 66.

A lower end support 77 is arranged at the lower part of the joint section 62 of the base body 61 as in the previously described embodiments.

If this holder is installed on the inside of the door at the driver's seat of the automobile as in the previously described embodiments, it can be used as described below.

When a magnetic metal juice can is pushed onto the joint section 62 of the holder, it can be easily attracted and held by the magnet parts 64, 64 provided in rectangular slits 63, 63 of the joint section 62. The lower end of the juice can is supported by the lower end support 77.

When removing the juice can from the holder, it is satisfactory to seize the can by hand and push down the operating bar 48 protruding from the upper end of the body 61. Thus, the coupling plate 66 retreats upon the lowering of the wedge-shaped member 67 and the magnet parts 64, 64 connected through the coupling bards 65, 65 are withdrawn. The distance between the magnet parts 64, 64 and the external periphery of the juice can becomes slightly longer and the juice can can be easily removed from the holder with one hand.

Finally, the following describes the sixth embodiment of the present invention, referring to FIGS. 21 to 25.

Figure 21:
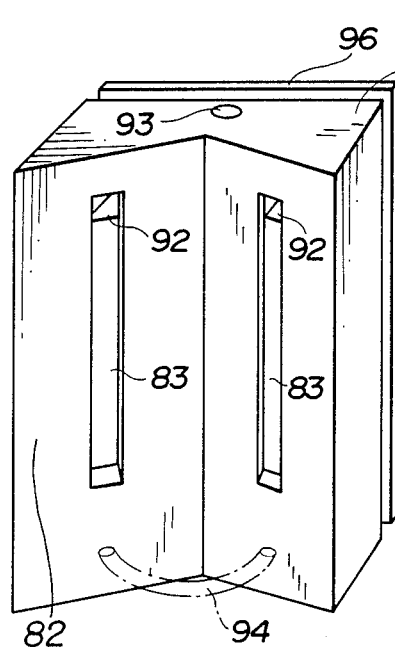
FIGS. 21 to 25 respectively show the sixth embodiment of the present invention.
Figure 22:
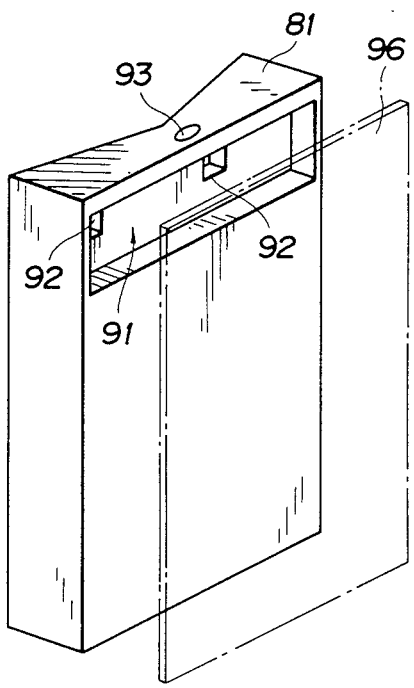

As shown in FIGS. 21 and 22, the front face of the plate type base body 81 is V-shaped defining a large angle and constituting a joint section 82. A vertical rectangular slit 83 is provided in both sloped faces of said joint section 82.

Both rectangular slits 83, 83 respectively communicate with through holes 92, 92 open to a space section 91 at the rear of the base body 81, at the top of each of said rectangular slits. The height of these continuous through holes 92, 92 should be equal to a required range of vertical movement of attracting plates 85, 85 described below.

The width of said space section 91 is almost equal to the length of an actuating plate 88 described below and the height of space section 91 slightly exceeds the required range of vertical movement of said attracting plates 85, 85. A through hole 93 for accommodating an operating bar 90 (described below), provided at the upper end of said actuating plate 88 and extending from the upper end of the base body 81, is formed at the center of the upper surface of said space section 91. The rear of said space section 91 is closed by adhering the cover plate 96 to the rear surface of the base body 91.

Figures 23, 24:
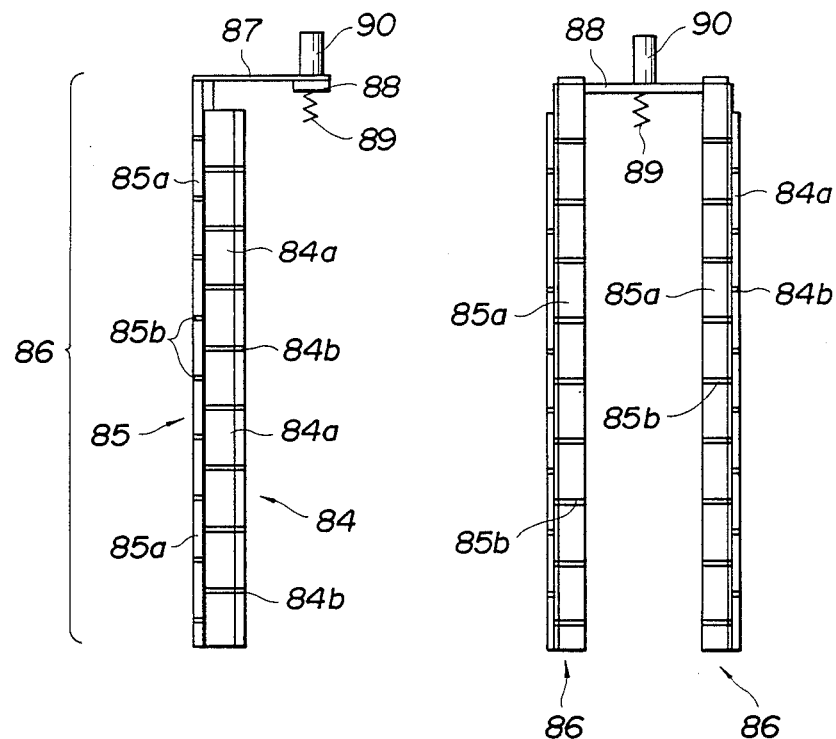
Figure 25:
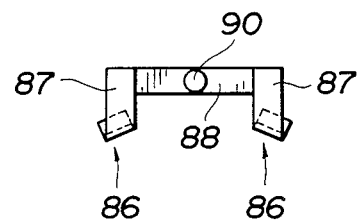

As shown in FIGS. 23 to 25, a pair of magnet parts 86, 86 each comprise a bar type magnet 84 and an attracting plate 85 which is vertically slidable in front of each of said magnets 84.

Each said bar type magnet 84 is formed by a plurality of magnets 84a, 84a, . . . and polar iron plates 84b inserted between adjacent magnets while matching the polarity of adjacent magnets. Each said attracting plate is formed by a plurality of magnetic metal plates 85a, 85a, . . . having the same length of magnets 84a of said bar type magnet 84, and sheets of non-magnetic material 85b having the same width as said polar iron plates 84b and interposed between adjacent magnetic metal plates 84.

Said magnet parts 86, 86 are mounted in said rectangular slits 83, 83 with attracting plates 85, 85 facing front. In this case, said bar type magnets 84, 84 are mounted in said rectangular slits so that the lower ends of these magnets are kept in contact with the lower ends of said rectangular slits 83, 83. The coupling plates 87, 87 are respectively coupled to the upper ends of said attracting plates 85, 85, extend to said space section 91 through said continuous through holes 92, 92, and are connected to the actuating plate 88 arranged in the space section 91. A compression spring 89 is interposed between the lower surface of said actuating plate 88 and the bottom of said space section 91 to impart a force acting in the vertical direction to said actuating plate 88. The upright operating bar 90 provided at the upper surface of the actuating plate 88 is inserted into said through hole 93 from said space section 91 so as to protrude from the upper end of the base body 81 in the vertical direction. When the operating bar 90 is vertically actuated, the actuating plate 88 moves vertically and, accordingly, the attracting plates 85, 85 move vertically through the coupling plates 87, 87.

Said required range of vertical movement of said attracting plates 85, 85 is limited due to the limitation on the vertical movement of the coupling plates 87, 87 by the upper and lower surfaces of said continuous through holes 92, 92, as described below.

The available range over which the operating bar 90 may be pushed down and the available range over which the compression spring 89 may urge the operating bar 90 up is limited by the upper and lower surfaces of the base body which defines the top and bottom of said continuous through holes 92, 92.

These ranges are limited so that the non-magnetic members 85b, 85b, . . . of said attracting plate 85 are positioned near the vertical center of magnets 84a, 84a, ... of said bar type magnet 84 (a position where the attracting plate 85 magnetically attracts a magnetic object) when the coupling plates 87, 87 are positioned near their upper limits, and the non-magnetic members 85b, 85b, ... of said attracting plate 85 are aligned with the polar iron plates 84b, 84b, . . . of said bar type magnet 84 (a position where the attracting plate 85 does not attract a magnetic object) when the coupling plates 87, 87 are positioned near their lower limits.

A lower end support 94 is provided at the lower end of the joint section 82 of the base body 81 as in the previously described embodiments.

If this holder is installed on the inside of the door at the driver's seat of the automobile as in the previously described embodiments, it can be used as described below.

For example, if a magnetic metal juice can is pushed onto the joint section 82 of the holder, the juice can can be easily attracted and held by the magnet parts 86, 86 provided in the rectangular slits 83, 83 of the joint section 82 (since the attracting plate 85 is disposed at the upper limit position at this time). In this case, the bottom of the juice can is held by the lower end support 94.

When removing the juice can from the holder, it is satisfactory to seize the can by hand and push down the operating bar 90 protruding from the upper end of the base body. Then, the actuating plate 88 lowers and the coupling plates 87, 87 coupled to the actuating plate 88 and the attracting plates 85, 85 are also lowered. The non-magnetic members 85a, 85a, . . . are aligned with the polar iron plates 84b, 84b, . . . of the bar type magnet 4 at the lower limit of the attracting plates 85, 85 and therefore, the magnetic metal plates 85a, 85a, ... of the attracting plates 85, 85 function to render the magnetism ineffective in holding the tubular container.

Thus, the juice can can be easily removed from the holder with one hand.

What is claimed is:

1. A holder for holding, in an upright position, a tubular container having a magnetically attractable component, said holder comprising:
    a base body having an upper part and a lower part and defining a front face extending between said upper and lower parts;
    at least two magnet parts mounted to said base body and comprising magnets which generate magnetic forces at the front face of said base body;
    a resilient support mounted to said base body and disposed below said magnets, said resilient support extending outwardly of the front face of said base body; and
    a guide slope plate located at the upper part of said base body, said guide slope plate defining a surface inclined, as taken in an upward direction extending outwardly of the upper part of the base body, from the front of said base body at which said front face is defined toward the rear of said base body such that a clearance having a wedge-shaped cross section is defined between said surface and a tubular container having a magnetically attractable component disposed against the front face of said base body when such a tubular container is attracted to said front face by said magnets.

2. A holder for holding, in an upright position, a tubular container having a magnetically attractable component, said holder comprising:
    a base body having an upper part and a lower part and defining a front face extending between said upper and lower parts;
    at least two magnet parts mounted to said base body and comprising magnets which generate magnetic forces at the front face of said base body;
    a support mounted to said base body and disposed below said magnets, said support extending outwardly of the front face of said base body; and
    means operatively associated with said magnets for rendering the magnetic forces generated by said magnets generally ineffective in attracting a tubular container having a magnetically attractable component against the front face of said base body,
    said means comprising a guide slope plate located at the upper part of said base body, said guide slope plate defining a surface inclined, as taken in an upward direction extending outwardly of the upper part of the base body, from the front of said base body at which said front face is defined toward the rear of said base body, a protrusion bar connected to said guide slope plate and extending adjacent the front face of said base body, and mounting means mounting said guide slope plate and the protruding bar connected thereto to said base body,
    said guide slope plate being movable, via said mounting means, between a first position at which said protruding bar connected thereto is retracted within said base body and a second position at which said protruding bar projects outwardly of said front face.

* * * * *